United States Patent [19]
Weitzen et al.

[11] Patent Number: 4,725,111
[45] Date of Patent: Feb. 16, 1988

[54] HOLOGRAMS EMBOSSED INTO METAL SURFACES

[75] Inventors: Edward H. Weitzen, Lawrence; Salvatore F. D'Amato, Floral Park, both of N.Y.

[73] Assignee: American Bank Note Holographics, Inc., Elmsford, N.Y.

[21] Appl. No.: 891,544

[22] Filed: Jul. 29, 1986

[51] Int. Cl.⁴ .............................................. G03H 1/18
[52] U.S. Cl. ......................... 350/3.85; 29/DIG. 37; 101/32; 350/3.6
[58] Field of Search ............ 350/3.6, 3.69, 3.85; 29/DIG. 37; 72/200, 202, 362, 364, 700, 344; 108/165; 206/139; 101/4, 6, 7, 8, 25, 27, 32, 35; 219/216, 243, 244, 388

[56] References Cited
U.S. PATENT DOCUMENTS
3,630,334 12/1971 Connolly .............................. 101/5
4,125,760 11/1978 Nyfeler ............................. 350/3.69

Primary Examiner—Bruce Y. Arnold
Assistant Examiner—Jay P. Ryan
Attorney, Agent, or Firm—Majestic, Gallagher, Parsons & Siebert

[57] ABSTRACT

A process for embossing diffraction patterns and holograms directly onto surfaces of metal material, such as aluminum, and products made thereby. Temperature ranges for optimizing the embossing are disclosed, being related to the yield strength of the material being embossed. End products include household aluminum foil with embossed holograms, and aluminum beverage cans with an embossed hologram on its outside.

9 Claims, 7 Drawing Figures

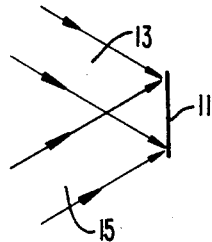
FIG._1.
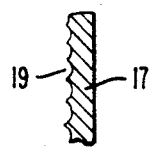
FIG._2.
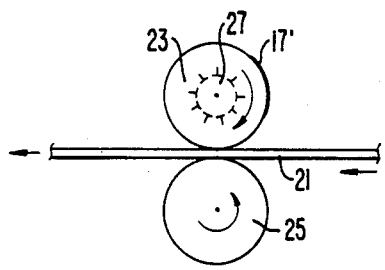
FIG._3.
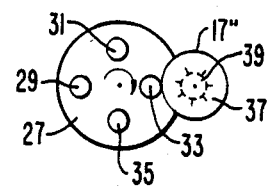
FIG._4.
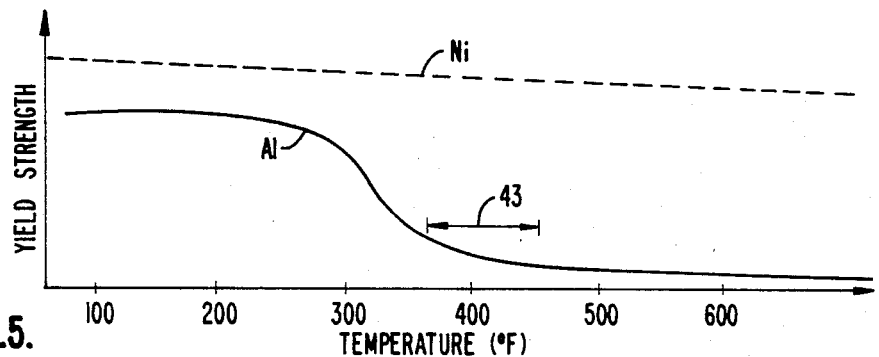
FIG._5.
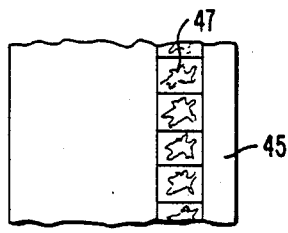
FIG._6.
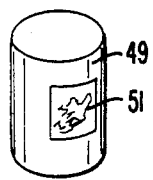
FIG._7.

HOLOGRAMS EMBOSSED INTO METAL SURFACES

BACKGROUND OF THE INVENTION

This invention relates generally to implementation of holography, and more specifically to the replication of holograms by embossing.

Mass replicated holograms are commonplace, appearing on credit cards, consumer packaging, and the like. The holograms allow viewing of images formed in reflective light at locations other than the hologram surface. This can be in the form of a three-dimensional image of an object or of a complex image having different planes.

Such holograms are made by interfering two beams of coherent light at a finite angle with each other on a photosensitive medium. One of the beams interacts with an object whose image is to be recorded, and the other is a reference beam. An image of the object is focused into or near the surface of the resulting hologram by appropriate optical elements, which may include use of another, intermediate hologram. The resulting master hologram is made to be of surface relief type; that is, the image information is stored in surface variations.

The fragile photographic hologram master is then used to make a rigid embossing master plate in order to emboss replicas. Such a rigid master is formed in an electrolytic bath on the surface of the photographic master. Multiple masters are then made from this first master, for use in embossing holograms on substrate material. The metal masters are generally made of nickel.

The most common substrate materials into which holograms are embossed by such masters include Mylar, a polyester, or similar sheet plastic material. Usually, such material has been coated with a thin layer of reflective material, such as aluminum, in order to result in a reflective hologram. The aluminum is usually vapor deposited onto the substrate in a thickness merely sufficient to provide reflective properties to the substrate.

The embossing process involves heating the aluminized substrate to a temperature at which it becomes plastic, and then the nickel master plate is forced against the substrate to imprint the surface relief pattern in it. The embossing is usually done through the aluminum coating, but it is the substrate itself that, upon cooling, holds the surface relief pattern. The aluminum layer follows the surface relief pattern and thus is capable of reconstructing the original holographically recorded image in reflected light.

In actual use, these replicated holograms are usually subsequently attached to another surface, such as that of a credit card blank. Such attachment is made by use of an ordinary adhesive or by use of hot stamping techniques.

It is a primary object of the present invention to develop techniques for embossing holograms onto a broader range of substrates.

SUMMARY OF THE INVENTION

This and additional objects are accomplished by the various aspects of the present invention, wherein, briefly, a metal master hologram is used to emboss a surface relief pattern directly onto a metal surface, thereby producing a reflection hologram in a single step. An example is the embossing of holograms on aluminum cans. Another example is the embossing of aluminum wrapping foil that is sold in grocery stores for use in food storage. Both of these are examples of currently useful articles having holograms embossed directly on their surfaces in order to provide decoration or display information, all without having to first replicate the hologram in sheet plastic material that must be subsequently attached to such articles in a separate step.

It has been found that holograms embossed in aluminum or other metals are optimized if the metal is maintained at a controlled elevated temperature during embossing. This temperature does not have to be raised to that which would make the metal plastic, as in the case with current replicating plastic materials, but rather can be significantly less than that. The lowest optimum temperature is selected depending upon the yield strength of the material. Most aluminum alloys and some other metals have a steep decline in their yield strength as a function of rising temperature over a small range while the change is very gradual over adjacent temperature ranges. An optimum operating temperature for embossing is at the high end of the steeply declining portion. Little advantage is gained in further incremental increases of the temperature, while significant disadvantages in the form of a higher yield strength of the material are incurred by incrementally decreasing the temperature from this optimum.

A hologram is treated herein as a particular type of diffraction grating. The same techniques as summarized above also apply to the embossing of a diffraction pattern that does not carry a holographically recorded image. Such a diffraction pattern may be used in certain applications where it is desired to develop a decorative color spread of reflected light without reconstructing an image. In either case, the surface relief pattern that is embossed onto the metal surface is very fine since it was formed by the interference of two beams of light. It is the fineness of the surface relief pattern that makes the embossing of it have some difficulties that are not experienced when embossing aluminum and other metals with much coarser patterns.

Additional advantages and features of the various aspects of the present invention will become apparent from the following description of its preferred embodiments, which description should be taken in conjunction with the accompanying drawings.

BRIEF DESCRIPTION OF THE DRAWINGS

FIG. 1 illustrates the construction of a hologram or diffraction element by interfering light beams;

FIG. 2 shows a portion of a surface relief metal embossing master;

FIG. 3 illustrates generally the embossing of aluminum or other metals according to the present invention;

FIG. 4 illustrates generally the embossing of aluminum or other metal cans according to the present invention;

FIG. 5 shows exemplary yield strength characteristics as a function of temperature for a master embossing plate and material being embossed;

FIG. 6 illustrates a completed embossed aluminum foil product; and

FIG. 7 illustrates a finished embossed aluminum can product.

DESCRIPTION OF THE PREFERRED EMBODIMENTS

Referring initially to FIG. 1, a standard technique is illustrated for making a hologram or other form of diffraction pattern. A photosensitive medium (detector) 11 is simultaneously illuminated with mutually coherent beams 13 and 15 that intersect the detector 11 at a finite angle with each other. The result is an interference pattern that is recorded by the detector 11. If one of the beams 13 and 15 carries information of an object and the other beam does not, the interference pattern recorded on the photodetector 11 is a hologram capable of reconstructing an image of the object.

In standard techniques of mass replicating holograms and diffraction patterns, a metal master is formed from the recorded photodetector 11. An example section 17 of such a metal embossment plate is illustrated in FIG. 2. A surface relief pattern 19 is formed in at least one surface of the metal master 17. This surface relief pattern is a recording of the interference pattern formed at the photodetector 11 in FIG. 1. The surface relief pattern is formed, according to one known technique, by electrolytic deposition of nickel on a photographic surface relief master, such as that made by the technique of FIG. 1. The surface relief pattern 19 is capable of diffracting light incident on it to reconstruct an image, in the case of a hologram, or to diffract the incident light into its various colors, in the case of a diffraction pattern.

Such a standard embossing master plate 17 is used to emboss the pattern onto a surface of continuous moving sheet material 21, as shown in FIG. 3. The sheet material 21 is a metal, aluminum being most easily embossed. The sheet material 21 can have a rather substantial thickness or can be extremely thin in the nature of household aluminum foil. An embossing master 17' is attached to a first rotating drum 23 so that the surface relief pattern of it contacts the top surface of the sheet material 21 as the drum 23 rotates. A second drum 25, under the sheet material 21, serves to compress the sheet material 21 between the two rollers in order that the surface relief pattern of the metal master 17' is forced against the sheet material 21 with enough pressure to transfer the surface relief pattern to the sheet material. Temperature of the sheet material 21 is increased by a heater 27, preferably contained within the roller 23. The roller 25 is preferably cooled (not shown) in order to prevent calendering of the material.

FIG. 4 schematically illustrates the technique for embossing aluminum cans after they have been formed. A wheel 27 contains a plurality of mandrels 29-35 held thereby and extending normally away from one surface of the wheel. Each of the mandrels is of a shape to hold an aluminum can on it. This type of structure is presently used for applying paint to a formed can. It may also be used to emboss a hologram or diffraction pattern onto the cans. A roller 37 can be positioned to contact each of the cans as the wheel 27 is rotated. A metal embossing plate 17" is carried by an outside surface of the wheel 37. The can is compressed between the mandrel 33 and the embossing plate 17", in the position shown in FIG. 4, to transfer the surface relief pattern onto an outside surface of the can. The embossing plate is heated by a heater 39 preferably carried within the wheel 37, in order to facilitate the embossing process. Each of the mandrels 29-35 is preferably cooled.

It has been found that there is an optimum temperature range in which the aluminum or other metal material is maintained when being embossed. The temperature is most important when the material being embossed is rigid, such as in the case of aluminum having a thickness of 1/16 inch or greater, in order to be able to emboss the surface relief pattern with faithfulness. For very thin, flexible metal foils, temperature is also important for optimizing the embossing process and thus the brightness of a reconstructed image from an embossed hologram. The temperature need not be raised to the point where the material becomes plastic, as in current techniques that use Mylar, polyesters and the like for the embossable material, but is preferably raised to within a small temperature range significantly less than the temperature at which the material becomes plastic.

Referring to FIG. 5, a preferred embossing temperature will be explained with respect to certain characteristics of the material. The solid curve generally illustrates example yield strength characteristics of an aluminum alloy as a function of temperature. The dashed curve shows an example yield strength characteristic of a nickel alloy. For this example, it is assumed that the material having the characteristics of the dashed outline is used for the embossing master and that that of the curve of the solid line is the material into which the surface relief pattern of the embossing master is being impressed. Yield strength of the material is a measure of the pressure required to produce a permanent deformation of a certain amount, usually 0.2% of its thickness. It is a well known, commonly used characteristic by which materials are specified.

It turns out that for most aluminum alloys, and for those of other metals as well, the yield strength drops dramatically over a narrow increasing temperature range, while remaining only gradually decreasing with increasing temperature over adjacent ranges. An optimum temperature, therefore, is within a range that is approximately illustrated at 43 in FIG. 5. This is at the upper end of such a sharply declining curve portion. It is optimum because the cost of further increasing temperature in the process brings little by way of a return of decreasing yield strength of the material being embossed. Conversely, if the temperature is decreased from that range, the yield strength increases dramatically and makes it more difficult to emboss the material with a faithful reproduction of the surface relief pattern on the nickel master. It will be noted from the dashed line of FIG. 5 that the yield strength of a nickel master is relatively constant over the temperature range shown and much higher than that of the aluminum material being embossed. Of course, the master plate must be many times less deformable at the embossing temperature chosen than is the material being embossed. It will also be noted from the curves of FIG. 5 that an operating temperature within the region marked 43 maintains substantially a maximum difference in yield strength of the embossing master (Ni) and material being embossed (Al), thereby increasing the life of the embossing master.

As with temperature, there is an optimum pressure range. That pressure is that which will permanently deform the material on the surface being embossed, but no more. In terms of standard material characteristics, the desired pressure is of a magnitude that is slightly beyond the yield point of the material. A higher pressure will produce little in the way of a better embossed product and has a disadvantage of reducing the life of the embossing master by increased wear and also may cause undesired calendering of the sheet material.

Referring to FIG. 6, a short length 45 of standard aluminum foil is illustrated after having a strip of multiple holograms 47 embossed in its surface. The embossed holograms add a decorative feature to an otherwise plain, utilitarian household object. Similarly, a beverage can 49 is illustrated in FIG. 7 to have a hologram 51 embossed on its outside surface. The hologram 51 can simply contain a decorative image, or, alternatively, can contain a portion of the labeling information.

Although the various aspects of the present invention have been described with respect to its preferred embodiments, it will be understood that the invention is entitled to protection within the full scope of the appended claims.

It is claimed:

1. A method of forming a hologram in a surface of aluminum, comprising:
   forming a metal master hologram containing fine grooves corresponding to an interference pattern formed by intersecting two coherent beams with each other at a finite angle therebetween, one of said beams carrying information of an object.
   heating said aluminum surface, and
   impressing the grooves of said metal master hologram against said aluminum surface while heated, thereby to form a hologram in said surface from which said object information may be viewed.

2. A method of forming a diffraction grating in a surface, comprising:
   selecting a metal having a yield strength that rapidly decreases as a function of its temperature over a given small increasing temperature range while decreasing much more gradually over a higher adjacent temperature range,
   heating the selected metal to a temperature that is substantially at least that of a higher portion of said given range but significantly less than a temperature which causes the metal to become plastic, and
   embossing a two-dimensional diffractive pattern into a surface of said metal while being so heated.

3. A method according to claim 2 wherein the step of heating the selected metal includes heating said metal to a temperature that is substantially that of the higher portion of said given range.

4. A method according to claim 2 wherein said diffraction grating is a fine surface relief pattern formed by the interference of two light beams.

5. The method according to claim 4 wherein said diffraction grating is a hologram.

6. A method according to claim 2 wherein said selected metal is an aluminum alloy in form of a beverage can.

7. A method according to claim 2 wherein said selected metal is an aluminum alloy in the form of thin, flexible wrapping foil.

8. A method according to claim 2 wherein said selected metal is either pure aluminum or an aluminum alloy.

9. A method according to claim 2 wherein the step of embossing a diffraction pattern includes the steps of selecting an embossing plate having a yield strength within said given temperature range that is significantly higher than that of said metal, forming the diffraction pattern in a surface of said embossing metal, and forcing the embossing metal surface against said selected metal surface at a pressure sufficient to permanently deform said selected metal.

* * * * *